United States Patent
Ryu et al.

[11] Patent Number: 6,043,925
[45] Date of Patent: Mar. 28, 2000

[54] THIN FILM ACTUATED MIRROR INCLUDING A SEEDING MEMBER AND AN ELECTRODISPLACIVE MEMBER MADE OF MATERIALS HAVING THE SAME CRYSTAL STRUCTURE AND GROWTH DIRECTION

[75] Inventors: Na-Young Ryu; Yun-Jin Ko, both of Seoul, Rep. of Korea

[73] Assignee: Daewoo Electronics Co., Ltd., Rep. of Korea

[21] Appl. No.: 09/107,126

[22] Filed: Jun. 30, 1998

[30] Foreign Application Priority Data

Jun. 30, 1997 [KR] Rep. of Korea ............... 97-28904
Jun. 30, 1997 [KR] Rep. of Korea ............... 97-29493

[51] Int. Cl.[7] .................. G02B 26/00; G02B 26/08
[52] U.S. Cl. ............................ 359/291; 359/224
[58] Field of Search ..................... 359/291, 295, 359/224, 221

[56] References Cited

U.S. PATENT DOCUMENTS 5,508,953   4/1996   Fukuda et al. ............... 365/145
5,608,569   3/1997   Kim ........................... 359/291
5,754,330   5/1998   Nam ........................... 359/291

FOREIGN PATENT DOCUMENTS 7-99252   4/1995   Japan .

*Primary Examiner*—Georgia Epps
*Assistant Examiner*—Suzanne Letendre
*Attorney, Agent, or Firm*—Pennie & Edmonds LLP

[57] ABSTRACT

An array of thin film actuated mirrors includes: an active matrix including a substrate, an array of connecting terminals; and an array of actuating structures, each of the actuating structures including an upper electrode functioning as a mirror as well as a common bias electrode, an electrodisplacive member made of a piezoelectric material, a seeding member made of a material having the same crystal structure and growth direction as that of the piezoelectric material constituting the electrodisplacive member, a lower electrode functioning as a signal electrode, an elastic member and a via contact.

8 Claims, 9 Drawing Sheets

THIN FILM ACTUATED MIRROR INCLUDING A SEEDING MEMBER AND AN ELECTRODISPLACIVE MEMBER MADE OF MATERIALS HAVING THE SAME CRYSTAL STRUCTURE AND GROWTH DIRECTION

FIELD OF THE INVENTION

The present invention relates to an array of thin film actuated mirrors; and, more particularly, each of the thin film actuated mirror including a seeding member and an electrodisplacive member made of materials having the same crystal structure and growth direction, and a method for forming the same.

BACKGROUND OF THE INVENTION

Among the various video display systems available in the art, an optical projection system is known to be capable of providing high quality displays in a large scale. In such an optical projection system, light from a lamp is uniformly illuminated onto an array of actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1H, there are cross sectional views illustrating a method for manufacturing an array 100 of thin film actuated mirrors 101 previous disclosed for use in an optical projection system.

The process for the manufacture of the array 100 begins with the preparation of an active matrix 110 including a substrate 112 and an array of connecting terminals 114. The substrate 112 is made of an insulating material, e.g., Si-wafer, and the connecting terminal 114 is made of a conducting material, e.g., tungsten (W), as shown in FIG. 1A.

In a subsequent step, there is formed a passivation layer 120, made of, e.g., PSG or silicon nitride, and having a thickness of 0.1–2 $\mu$m, on top of the active matrix 110 by using, e.g., a CVD or a spin coating method.

Thereafter, an etchant stopping layer 130, made of silicon nitride, and having a thickness of 0.1–2 $\mu$m, is deposited on top of the passivation layer 120 by using, e.g., a sputtering or a CVD method, as shown in FIG. 1B.

Then, a sacrificial layer 140, made of a PSG and having a flat top surface, is formed on top of the etchant stopping layer 130 by using a CVD or spin coating method, followed by a chemical mechanical polishing (CMP) method.

Subsequently, an array of empty cavities 145 is created in the sacrificial layer 140 in such a way that each of the empty cavities 145 encompasses one of the connecting terminals 114 by using a dry or an wet etching method, as shown in FIG. 1C.

In a next step, an elastic layer 150, made of a nitride, e.g., silicon nitride, and having a thickness of 0.1–1 $\mu$m, is deposited on top of the sacrificial layer 140 including the empty cavities 145 by using a CVD method.

Thereafter, a lower electrode layer 160, made of an electrically conducting material, e.g., Pt or Ta, and having a thickness of 0.1–1 $\mu$m, is formed on top of the elastic layer 150 by using a sputtering or a vacuum evaporation method, as shown in FIG. 1D.

Then, an electrodisplacive layer 170, made of a piezoelectric material, e.g., PZT, and having a thickness of 0.1–1 $\mu$m, is formed on top of the lower electrode layer 160 by using a sol-gel method.

Subsequently, an upper electrode layer 180, made of an electrically conducting and light reflecting material, e.g., aluminum (Al) or silver (Ag), and having a thickness of 0.1–1 $\mu$m, is formed on top of the electrodisplacive layer 170 by using a sputtering or a vacuum evaporation method, thereby forming a multiple layered structure 200, as shown in FIG. 1E.

In an ensuing step, as shown in FIG. 1F, the multiple layered structure 200 is patterned by using a photolithography or a laser trimming method, until the sacrificial layer 140 is exposed.

In a subsequent step, an array of conduits 190, made of a metal, e.g., tungsten(W), is formed by using a lift-off method thereby forming an array of actuating structures 210, wherein each of actuating structures 210 includes an upper electrode 185, an electrodisplacive member 175, a lower electrode 165, an elastic member 155 and a conduit 190, the conduits 190 extending from the lower electrode 165 to a corresponding connecting terminal 114, as shown in FIG. 1G.

Finally, the sacrificial layer 140 is removed by using an wet etching method using an etchant or a chemical, e.g., hydrogen fluoride (HF) vapor, to thereby form an array 100 of thin film actuated mirrors 101, as shown in FIG. 1H.

There are certain deficiencies associated with the above described method for the manufacture of the array 100 of thin film actuated mirrors 101. For example, in order to obtain optimum piezoelectric properties in the piezoelectric material, e.g., PZT, constituting the electrodisplacive layer 170, grains must grow in certain direction, e.g., <111>. However, when the electrodisplacive layer 170 is formed using the sol-gel method, there is a likelihood of the grains not growing the required direction, resulting in the piezoelectric material not having the optimum piezoelectric properties.

Further, when the electrodisplacive layer 170 is thus formed, grains therein may also become large, causing the top surface of the electrodisplacive layer 170 to become rough. When the upper electrode layer 180 functioning as a mirror is consequently formed on top thereof, the top surface of the upper electrode layer 180 may also become rough, which will, in turn, detrimentally affect the optical efficiency of the array.

SUMMARY OF THE INVENTION

It is, therefore, a primary object of the present invention to provide an array of thin film actuated mirrors, each of thin film actuated mirror including an electrodisplacive member in which grains are grown in a required direction.

It is another object of the present invention to provide a method for ensuring the grains constituting the electrodisplacive member to grow in the required direction.

In accordance with one aspect of the present invention, there is provided an array of thin film actuated mirrors for use in an optical projection system, the array comprising: an active matrix including a substrate, an array of connecting terminals; and an array of actuating structures, each of the actuating structures including an upper electrode functioning as a mirror as well as a common bias electrode, an electrodisplacive member, a seeding member, a lower electrode functioning as a signal electrode, an elastic member and a via contact, wherein materials constituting the seeding member and the electrodisplacive member have the same crystal structure and growth direction.

In accordance with another aspect of the present invention, there is provided a method for manufacturing an array of thin film actuated mirrors, the method comprising the steps of: preparing an active matrix including a substrate and an array of connecting terminals; forming a sacrificial layer including an array of empty cavities; forming an elastic layer and a lower electrode layer on top of the sacrificial layer including the empty cavities, successively; forming a seeding layer on top of the lower electrode layer; forming an electrodisplacive layer; forming an upper electrode layer on top of the electrodisplacive layer to thereby form a multiple layered structure; patterning the multiple layered structure into an array of semifinished actuating structures until the sacrificial layer is exposed; forming an array of via contact thereby forming an array of actuating structures; and removing the sacrificial layer to thereby form an array of thin film actuated mirrors.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1A:
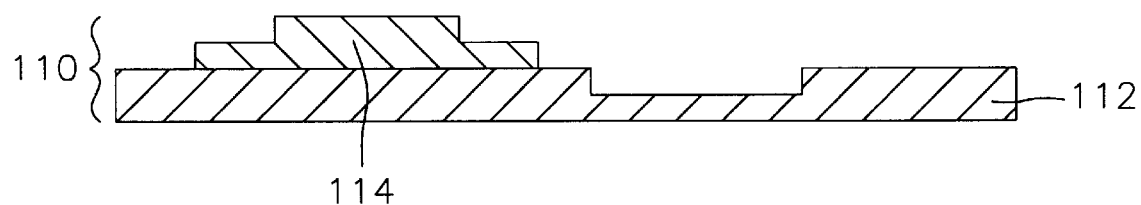
FIGS. 1A to 1H is a schematic cross sectional view illustrating an array of thin film actuated mirrors previously disclosed.
Figure 1B:
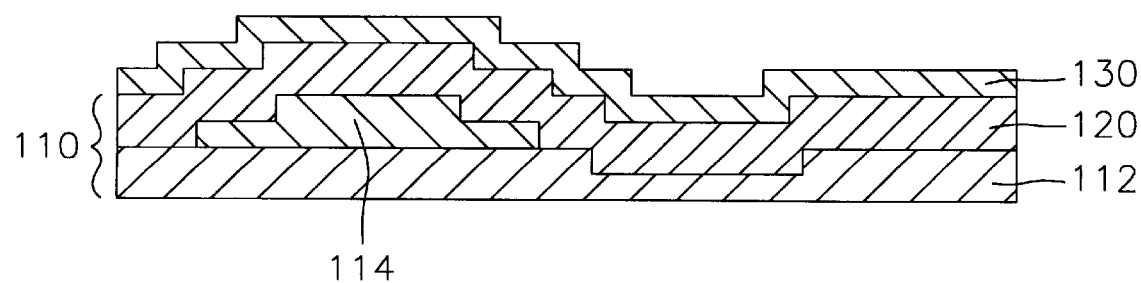
Figure 1C:
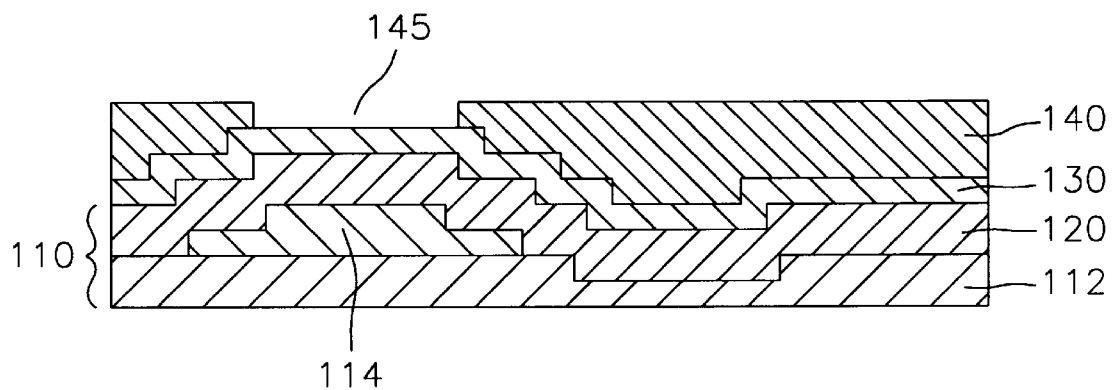
Figure 1D:
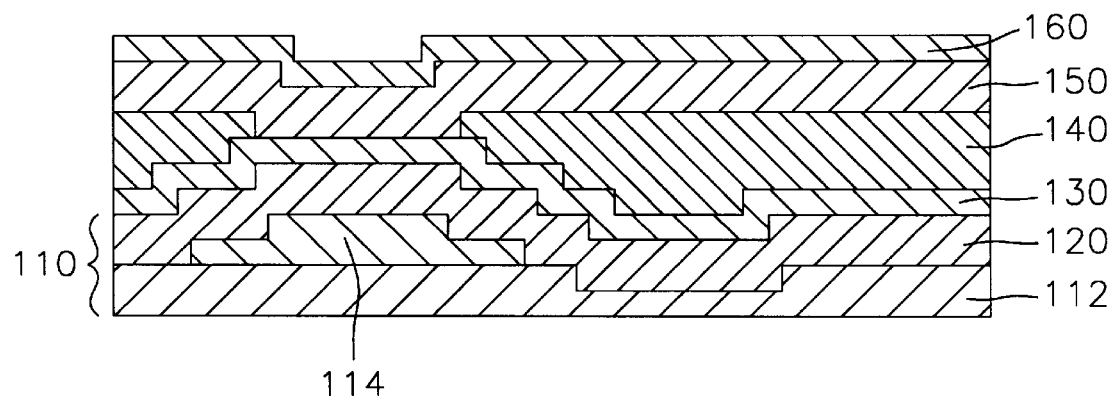
Figure 1E:
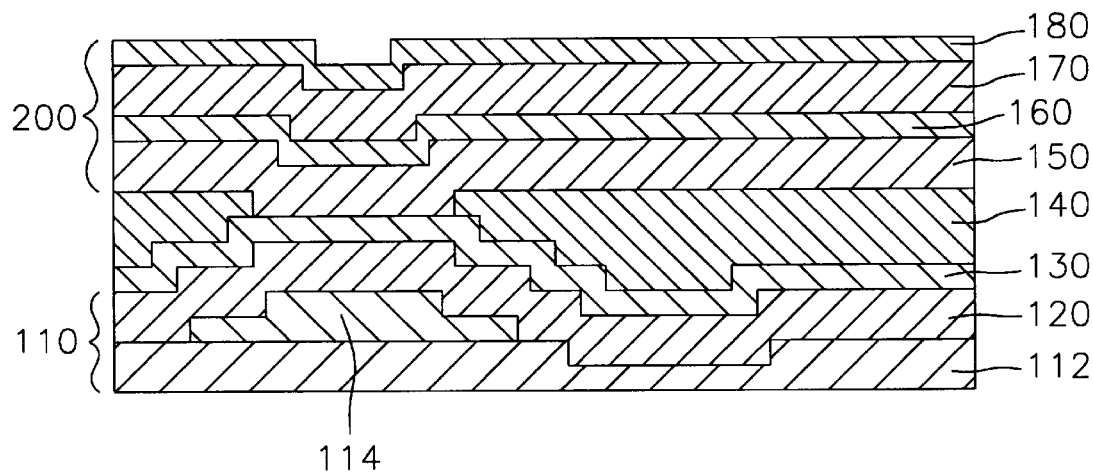
Figure 1F:
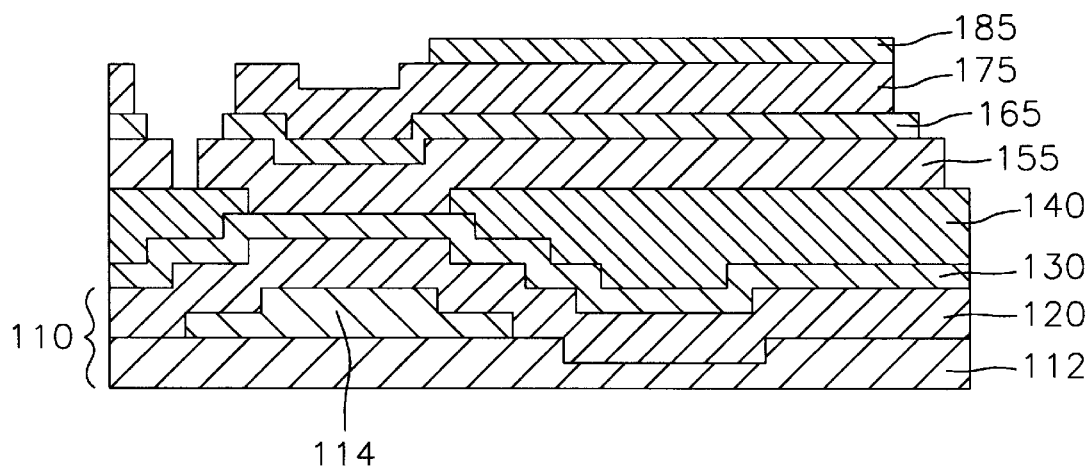
Figure 1G:
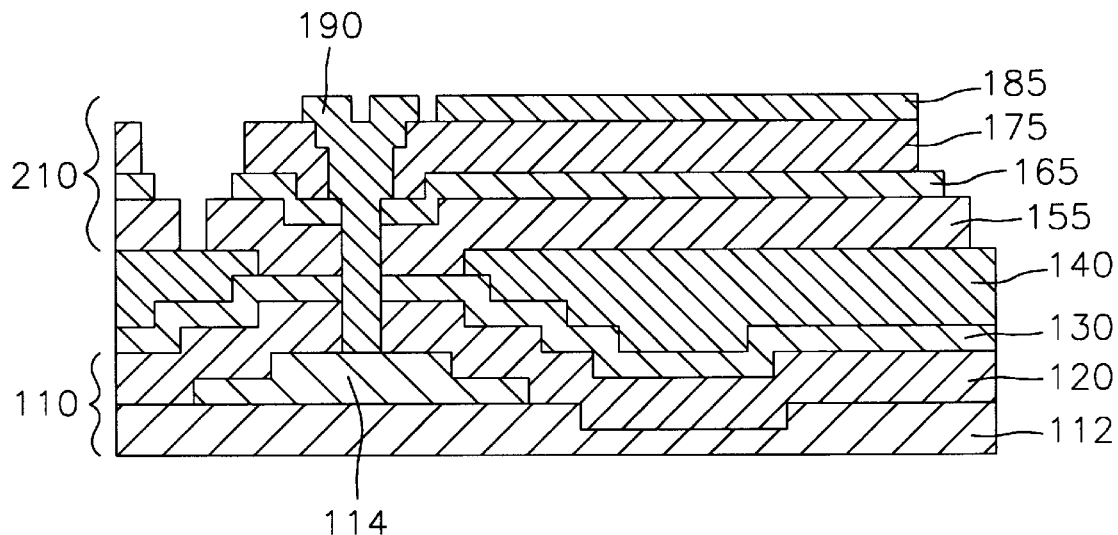
Figure 1H:
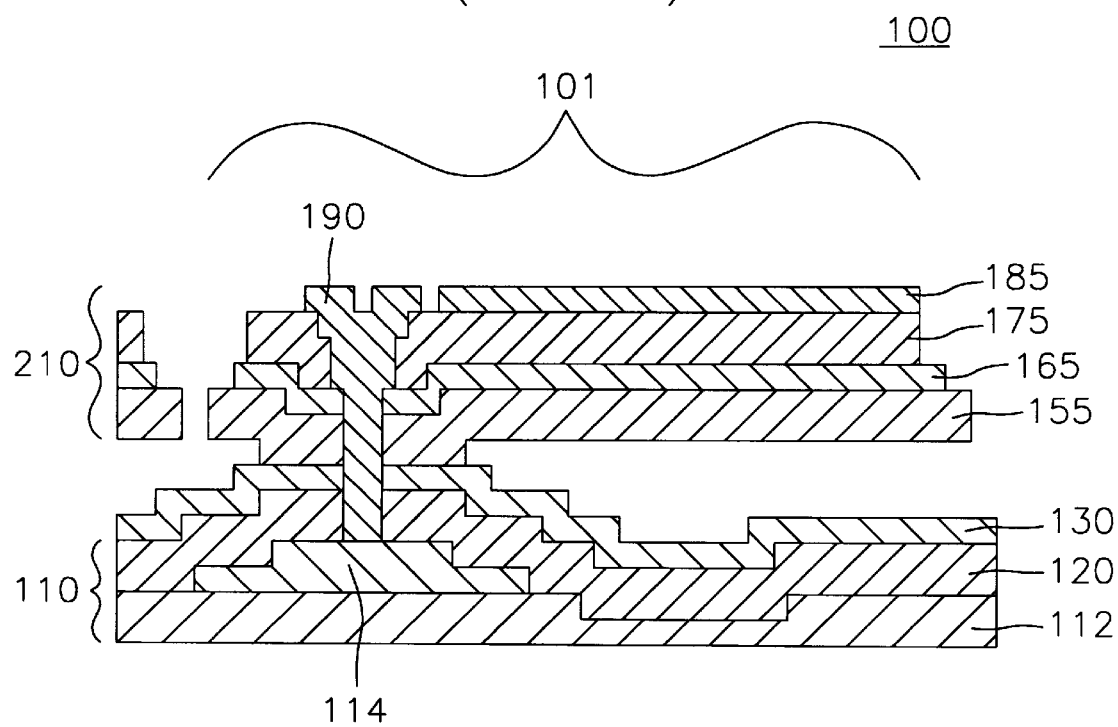
Figure 2:
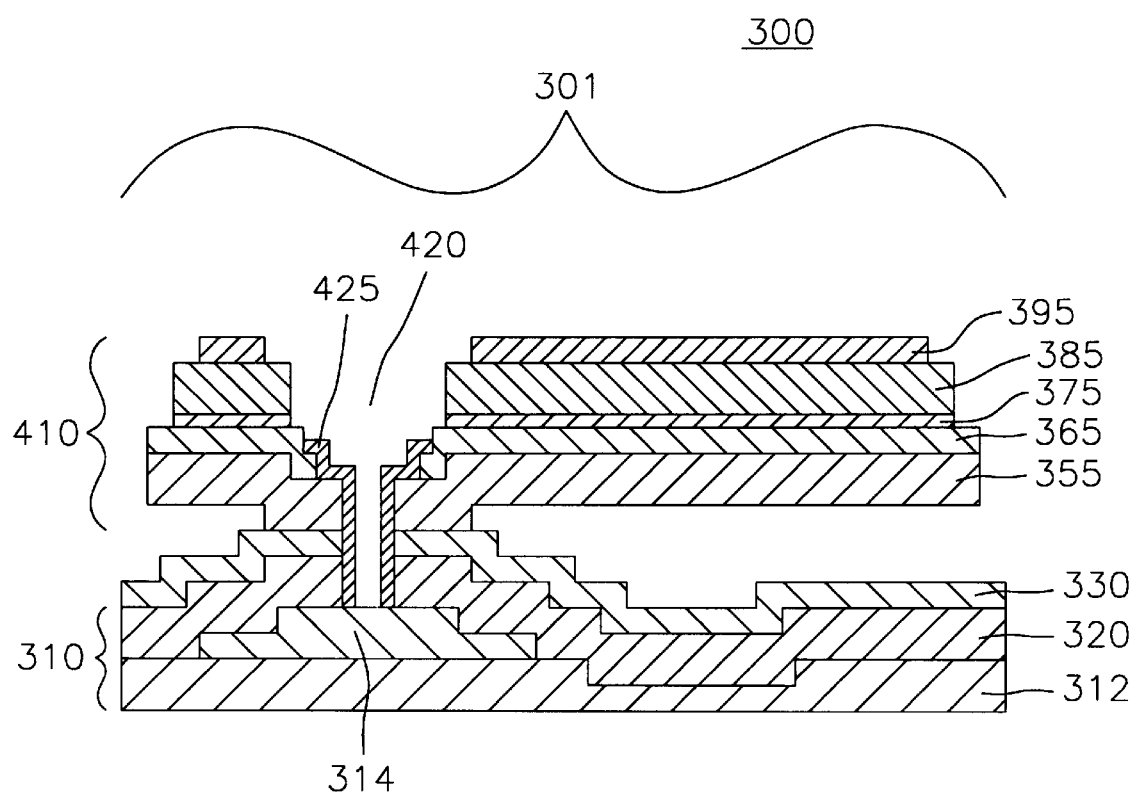
FIG. 2 is a schematic cross sectional view setting forth the array of thin film actuated mirrors in accordance with the present invention.

There are provided in FIGS. 2 and 3A to 3G a cross sectional view setting forth an array 300 of thin film actuated mirrors 301 in accordance with the present invention and schematic cross sectional views illustrating a method for manufacturing an array of thin film actuated mirrors shown in FIG. 2. It should be noted that like parts appearing in FIGS. 2 and 3A to 3G are represented by like reference numerals.

In FIG. 2, an array 300 of thin film actuated mirrors 301 includes an active matrix 310, a passivation layer 320, an etchant stopping layer 330 and an array of actuating structures 410.

The active matrix 310 is provided with a substrate 312, and an array of connecting terminals 314. The substrate 312 is made of an insulating material, e.g., Si-wafer.

The passivation layer 320, made of, e.g., PSG or silicon nitride and having a thickness of 0.1–2 $\mu$m, is located on top of the active matrix 310.

The etchant stopping layer 330, made of silicon nitride and having a thickness of 0.1–2 $\mu$m, is positioned on top of the passivation layer 320.

Each of the actuating structures 410 is provided with a proximal and a distal ends and includes an upper electrode 395, an electrodisplacive member 385, a seeding member 375, a lower electrode 365, an elastic member 355 and a via contact 425. The upper electrode 395, made of a light reflecting and electrically conducting material, e.g., Al, Ag or Pt, is located on top of the electrodisplacive member 385 and is electrically connected to ground, thereby functioning as a bias electrode as well as a mirror. The electrodisplacive member 385 made of a piezoelectric material, e.g., PZT, is positioned on top of the seeding member 375. The seeding member 375 is made of a material having the same crystal structure and growth direction as that of the material constituting the electrodisplacive member 385 and is positioned on top of the lower electrode 365. For example, if the electrodisplacive member 385 is made of PZT, a suitable material for the seeding member 375 is $PbTiO_3$. The lower electrode 365, made of an electrically conducting material, e.g., Ta or Pt/Ta, is located on top of the elastic member 355 and is electrically connected to a corresponding connecting terminal 314 through the via contact 425, thereby functioning as a signal electrode. The elastic member 355 made of an insulating material is located below the lower electrode 365, a bottom portion at the proximal end thereof being attached on top of the active matrix 310, with the etchant stopping layer 330 and the passivation layer 320 partially intervening therebetween, thereby cantilevering the actuating structure 410. The via contact 425 extends from the lower electrode 365 to a corresponding connecting terminal 314, thereby electrically connecting the lower electrode 365 to the corresponding connecting terminal 314. The electrodisplacive member 385 deforms in response to the electrical field applied to the upper electrode 395 and the lower electrode 365.

In FIGS. 3A to 3G, there is provided cross sectional views illustrating a method for manufacturing the array 300 of thin film actuated mirrors 301 shown in FIG. 2.

The process for the manufacture of the array 300 begins with the preparation of an active matrix 310 including a substrate 312 and an array of connecting terminals 314.

In a subsequent step, there is formed a passivation layer 320, made of, e.g., PSG or silicon nitride, and having a thickness of 0.1–2 $\mu$m, on top of the active matrix 310 by using, e.g., a CVD or a spin coating method.

Figure 3A:
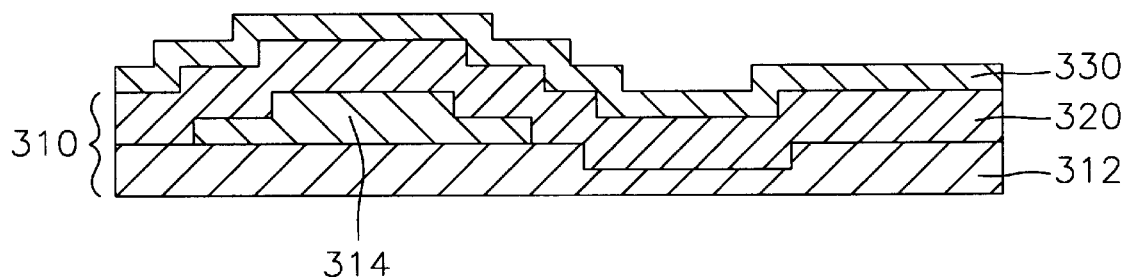
FIGS. 3A to 3G are schematic cross sectional views illustrating a method for manufacturing an array of thin film actuated mirrors shown in FIG. 2.

Thereafter, an etchant stopping layer 330, made of silicon nitride and having a thickness of 0.1–2 $\mu$m, is deposited on top of the passivation layer 320 by using, e.g., a sputtering or a CVD method, as shown in FIG. 3A.

Then, a sacrificial layer 340 made of, e.g., PSG, is formed on top of the etchant stopping layer 330 by using an atmosphere press chemical vapor deposition (APCVD) method and followed by a CMP method.

Figure 3B:
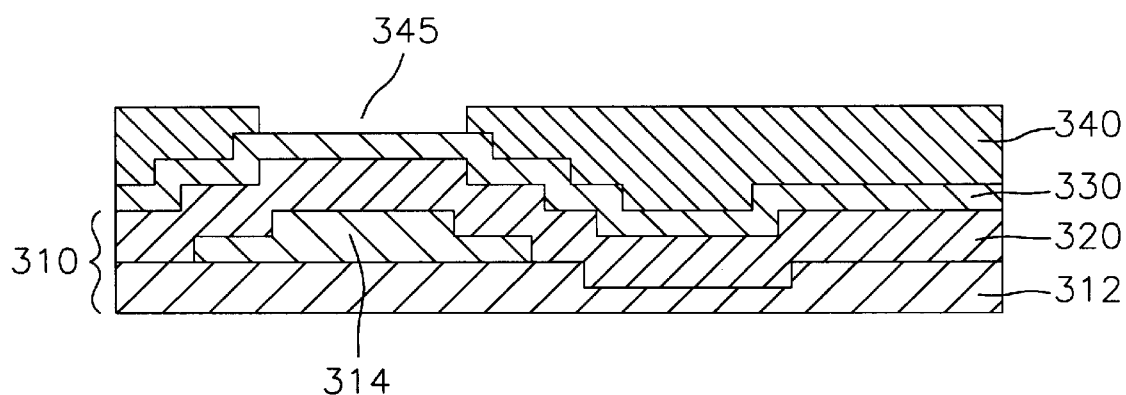

In a ensuing step, an array of empty cavities 345 is created in the sacrificial layer 340 in such a way that each of the empty cavities 345 encompasses one of the connecting terminals 314 by using a dry or an wet etching method, as shown in FIG. 3B.

In a next step, an elastic layer 350, made of silicon nitride and having a thickness of 0.1–1.0 $\mu$m, is deposited on top of the sacrificial layer 340 including the empty cavities 345 by using a LPCVD method.

Figure 3C:
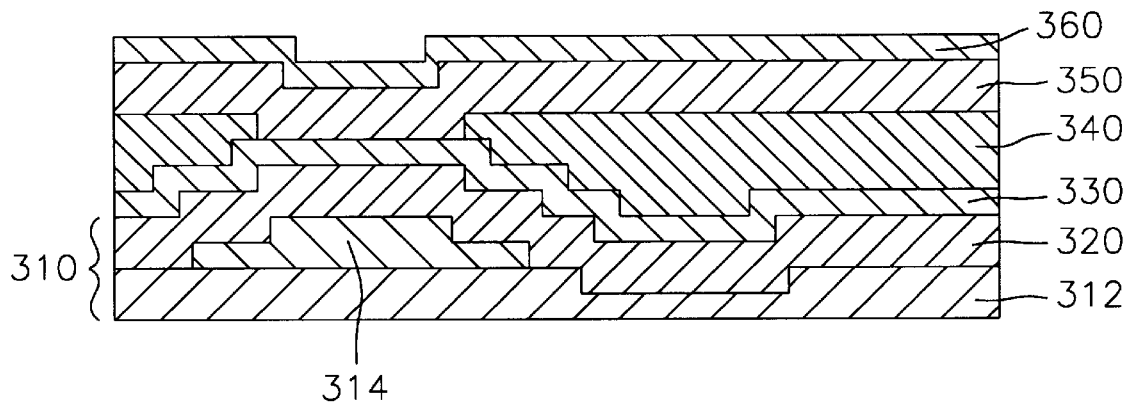

Thereafter, a lower electrode layer 360, made of an electrically conducting material, e.g., Pt/Ta, and having a thickness of 0.1–1.0 μm, is formed on top of the elastic layer 350 by using a sputtering or CVD method, as shown in FIG. 3C.

In a next step, a seeding layer 370 is formed on top of the lower electrode layer 360 by using a spin-coating method, wherein the seeding layer 370 has a thickness of 10–90 Å and is made of a material, e.g., $PbTiO_3$, having the same crystal structure and growth direction as the material constituting the electrodisplacive layer 380 to be formed on top thereof. The seeding layer 370 provides nucleation sites for the electrodisplacive layer 380 to be formed on top thereof.

Subsequently, The electrodisplacive layer 380, made of a piezoelectric material, e.g., PZT, and having a thickness of 0.1–1.0 μm, is formed on top of the seeding layer 370 by using a sol-gel method. The sol-gel method is similar to other conventional sol-gel methods except that, during the mixing of the precursor solutions, acetyl-acetone is added to increase the rate of hydrolysis, facilitating the formation of small grain sized electrodisplacive layer 380.

Figure 3D:
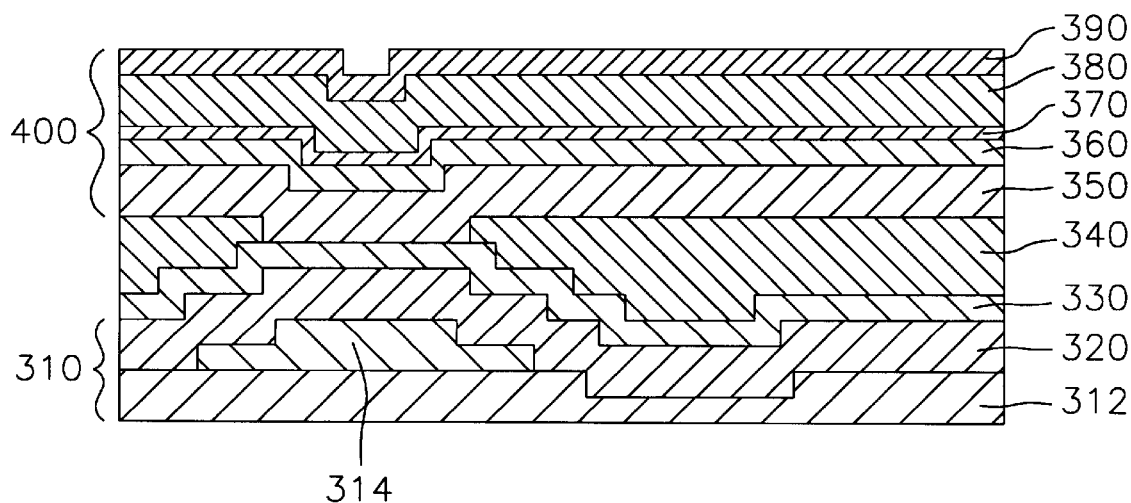

Subsequently, an upper electrode layer 390, made of an electrically conducting and light reflecting material, e.g., aluminum (Al), silver (Ag) or platinum (Pt), and having a thickness of 0.1–1.0 μm, is deposited on top of the electrodisplacive layer 380 by using a sputtering method, thereby forming a multiple layered structure 400, as shown in FIG. 3D.

Figure 3E:
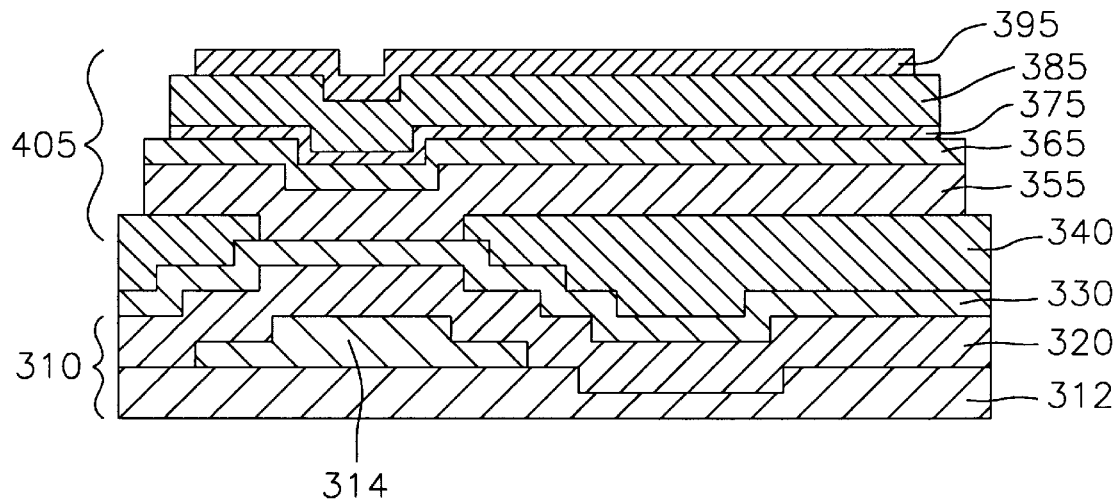

In an ensuing step, as shown in FIG. 3E, the multiple layered structure 400 is patterned into an array of semifinished actuating structures 405 by using a photolithography or a laser trimming method, until the sacrificial layer 340 is exposed, wherein each of the semifinished actuating structures 405 includes an upper electrode 395, an electrodisplacive member 385, a seeding member 375, a lower electrode 365 and an elastic member 355.

Figure 3F:
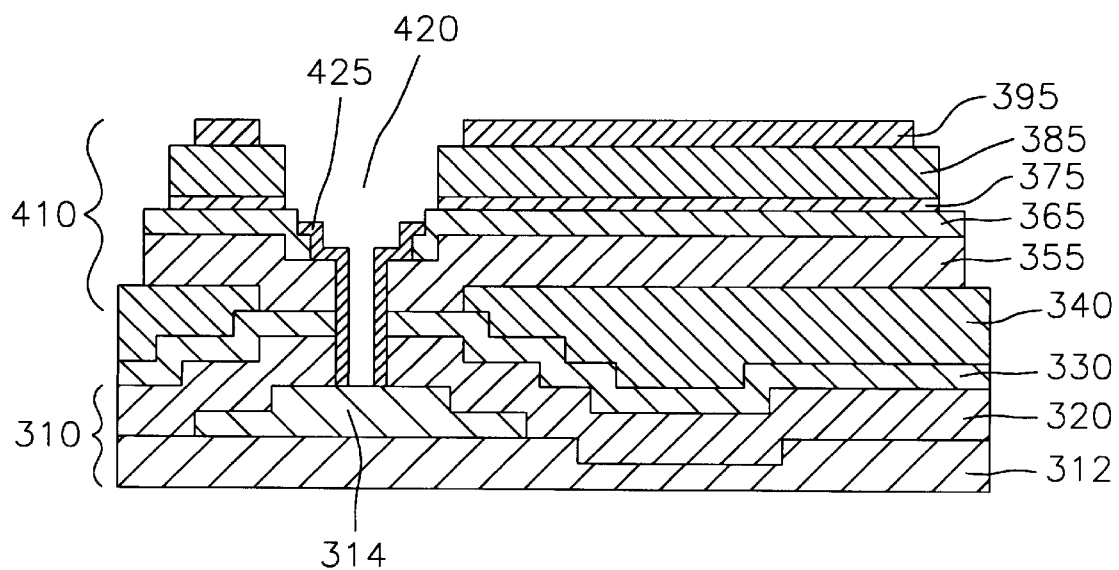

In a subsequent step, an array of via holes 420 is created in the semifinished actuating structures 400, wherein each of the via holes 420 extends from top of the upper electrode 395 to top of a corresponding connecting terminal 314. Thereafter, an array of via contact 425 is formed inner side of the via holes, wherein each of the via contact 425 electrically connects the lower electrode 365 to the corresponding connecting terminal 314, to thereby form an array of actuating structures 410, as shown in FIG. 3F.

Figure 3G:
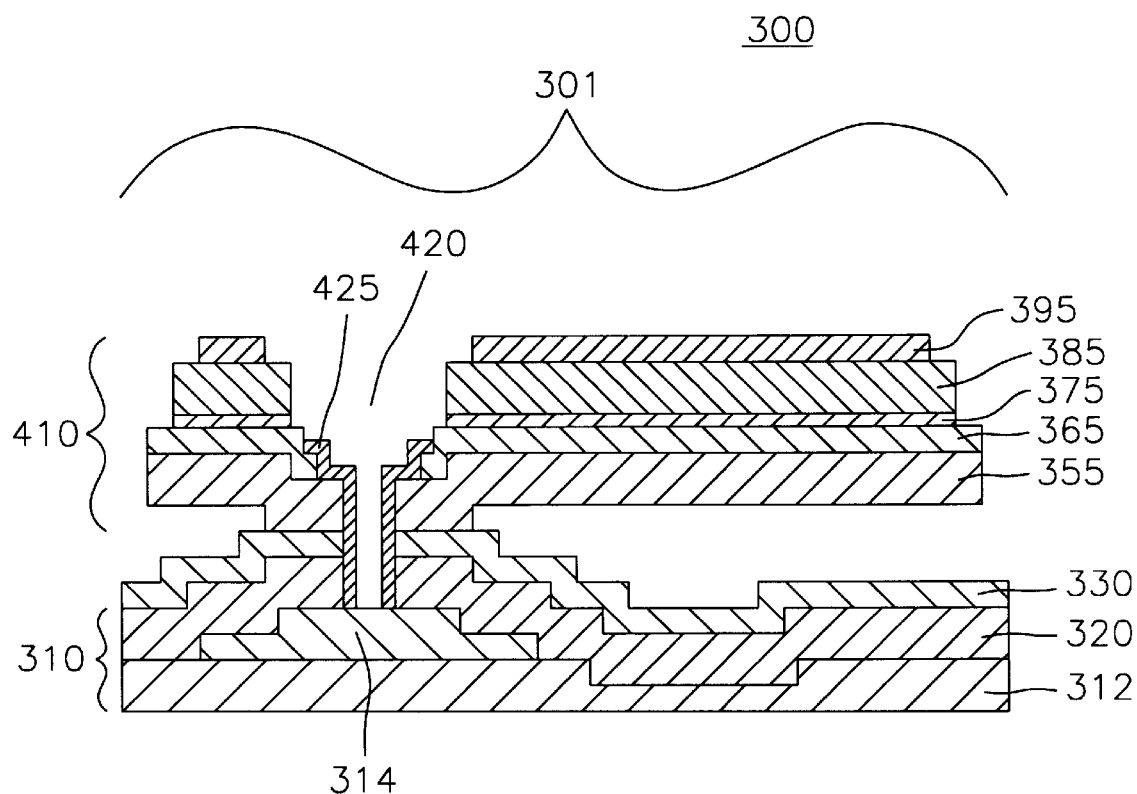

The sacrificial layer 340 is then removed by using an wet etching method using an etchant or a chemical, e.g., hydrogen fluoride (HF) vapor to thereby form the array 300 of thin film actuated mirrors 301, as shown in FIG. 3G.

During the method for manufacturing the inventive array 300 of thin film actuated mirrors 301, since the material constituting the seed layer 370 has the same crystal structure and growth direction as the material constituting the electrodisplacive layer 380 and since it acts as the nucleation sites, the grains constituting the electrodisplacive layer 380 are grown in the required direction, ensuring the optimum piezoelectric properties thereof.

Further, during the formation of the electrodisplacive layer 380 by using a sol-gel method, the addition of acetylacetone facilitates the formation of small grain sized electrodisplacive layer 380, which will, in turn, reduce the roughness of the top surfaces thereof. Consequently, since the roughness of the top surface of the upper electrode layer 390 functioning as a mirror is directly dependent on the roughness of the top surface of the electrodisplacive layer 380, the top surface of the upper electrode layer may also have a reduced roughness, which will, in turn, enhance the optical efficiency of the thin film actuated mirror 301.

While the present invention has been described with respect to certain preferred embodiments only, other modifications and variations may be made without departing from the spirit and scope of the present invention as set forth in the following claims.

What is claimed is:

1. An array of thin film actuated mirrors includes an active matrix and an array of actuating structures, the active matrix including a substrate, an array of connecting terminals and each actuating structure including an upper electrode functioning as a mirror as well as a common bias electrode, an electrodisplacive member, a lower electrode functioning as a signal electrode, an elastic member and a via contact, wherein each actuating structure further includes a seeding member positioned below the electrodisplacive member, and wherein materials for the seeding member and materials for the electrodisplacive member have the same crystal structure and growth direction.

2. The array of claim 1, wherein the seeding member is made of $PbTiO_3$.

3. The array of claim 1, wherein the electrodisplacive member is made of PZT.

4. The array of claim 1 further includes a passivation layer and an etchant stopping layer on top of the active matrix, successively.

5. A method for manufacturing an array of thin film actuated mirrors is comprised the steps of preparing an active matrix including a substrate and an array of connecting terminals, forming a sacrificial layer including an array of empty cavities, forming an elastic layer and a lower electrode layer on top of the sacrificial layer including the empty cavities, successively, forming a seeding layer on top of the lower electrode layer, forming an electrodisplacive layer, forming an upper electrode layer on top of the electodisplacive layer to thereby form a multiple layered structure, patterning the multiple layered structure into an array of semifinished actuating structures until the sacrificial layer is exposed, forming an array of via contact thereby forming an array of actuating structures and removing the sacrificial layer to thereby form the array of thin film actuated mirrors wherein, the step of forming the seeding layer includes steps of spin-coating and crystallizing a material which has the same crystal structure and growth direction as that of the electrodisplacive layer, for providing nucleation sites for the electrodisplacive layer.

6. The method of claim 5, further comprises steps of forming a passivation layer and an etchant stopping layer on top of the active matrix, successively.

7. The method of claim 5, wherein the electrodisplacive layer is formed by using a sol-gel method.

8. The method of claim 7, wherein the sol-gel method includes a step of adding acetyl-acetone.

* * * * *